(12) United States Patent
Lehner et al.

(10) Patent No.: US 7,065,241 B2
(45) Date of Patent: Jun. 20, 2006

(54) METHOD FOR MONITORING A DETECTION REGION OF A WORKING ELEMENT

(75) Inventors: Werner Lehner, Gröbenzell (DE);
Anton Kummert, Sprockhövel (DE);
Jörg Velten, Remscheid (DE)

(73) Assignee: Leuze lumiflex GmbH & Co., München (DE)

( * ) Notice: Subject to any disclaimer, the term of this patent is extended or adjusted under 35 U.S.C. 154(b) by 882 days.

(21) Appl. No.: 09/755,197

(22) Filed: Jan. 8, 2001

(65) Prior Publication Data

US 2001/0041077 A1    Nov. 15, 2001

(30) Foreign Application Priority Data

Jan. 7, 2000    (DE)    ................ 100 00 287

(51) Int. Cl.
*G06K 9/00*    (2006.01)
(52) U.S. Cl. .................. 382/152; 382/165; 382/103
(58) Field of Classification Search ................ 382/152, 382/165, 103, 110–112
See application file for complete search history.

(56) References Cited

U.S. PATENT DOCUMENTS 5,202,933 A * 4/1993 Bloomberg ................ 382/176
5,912,980 A * 6/1999 Hunke ....................... 382/103
6,075,238 A * 6/2000 Fembok ...................... 250/221

FOREIGN PATENT DOCUMENTS

| DE | 43 39 161 C2 | 2/1995 |
| DE | 196 19 688 A1 | 11/1997 |
| EP | 0179 252 A2 | 4/1986 |
| WO | WO 97/04428 | 2/1997 |

OTHER PUBLICATIONS

English translation of EP 0 179 252.*

* cited by examiner

*Primary Examiner*—Bhavesh M. Mehta
*Assistant Examiner*—John Strege
(74) *Attorney, Agent, or Firm*—Venable LLP; Robert Kinberg; Catherine M. Voorhees

(57) ABSTRACT

The invention relates to an apparatus and a method for monitoring a detection region of a working element (100). The apparatus has at least one camera for continuously monitoring the detection region, and an evaluation unit (53), into which image information generated by the camera is read. In the evaluation unit (53), a comparison of the image information to reference images, and/or a color-feature analysis, allows the detection of endangered objects within at least one protection zone in the detection region. If at least one endangered object is detected inside the protection zone, the evaluation unit (53) disables the working element (100). In contrast, if no endangered object (54) is located inside the protection zone, the evaluation unit (53) enables the working element (100).

5 Claims, 7 Drawing Sheets

METHOD FOR MONITORING A DETECTION REGION OF A WORKING ELEMENT

FIELD OF THE INVENTION

The invention relates to an apparatus and a method for monitoring a detection region of a working element.

BACKGROUND OF THE INVENTION

The working element can be formed by, for example, a folding press that has at least one upper tool and one lower tool, which cooperate to bend and bevel workpieces comprising pieces of sheet metal, in particular. For this purpose, the upper tool is guided toward the lower tool in a pressing movement, thereby deforming a piece of sheet metal, which is disposed between the two tools, along a fold line. Folding presses of this type are potentially hazardous to the operator, because the workpiece must usually be guided manually during the pressing movement. Consequently, the operator's hands and fingers are near the upper and lower tools, or near the squeezing and shearing points of the folding press or the workpiece, which puts the operator at risk for serious injury.

To make these detection regions safer, it is standard practice to use protective devices that disable the working element if the operator has inadvertently intruded into the detector region.

These protective devices can take the form of two-handed switches that protect the operator's hands by requiring the actuation of two levers to initiate and maintain a potentially dangerous movement in a folding press. The operator must therefore keep both hands on the levers, which safeguards him against injury during press operation.

A drawback of this device, however, is that other persons in the detection region are unprotected. A further drawback is that the operator cannot manually guide the workpiece during machining, which can be problematic. The operator therefore often chooses to disable the protective device and guide the workpiece manually in the detection region, without protection.

Safety light curtains are also used as protective devices. DE 39 39 191 C3, for example, discloses such a device. In this case, the safety light curtains comprise numerous pairs of transmitters and receivers that respectively form a light barrier.

The light beams emitted by the transmitters and aimed at the respectively associated receivers cover a planar, two-dimensional monitoring region. It is possible to detect that a hand is approaching a detection region, whereupon the working element is disabled.

A safety light curtain of this nature is typically disposed vertically, and serves to bar access to a folding press. In the machining of larger pieces, it is advantageous to arrange the safety light curtain horizontally to secure the region. A disadvantage of this arrangement is that a plurality of safety light curtains is required for completely securing the detection region of this folding press, especially with respect to preventing access and securing the region. This requirement not only raises costs to an undesirable level, but is also associated with complicated assembly, often with only insufficient space available for the devices.

DE 196 19 688 A1 relates to a method for video monitoring of operator areas, such as of a press, in which a video camera optically detects the operator area to be monitored, and generates an electronically-processable image of the open operator space, which the camera supplies to an image processor, where it is stored.

Prior to each startup of the press, the video camera records an image of the operator area and compares the generated image to the image stored in the image processor. The press can only be started up if the new image is identical to the stored image.

A disadvantage of this method is that any deviation of a current image from the reference image disables the press, even if the deviation would not pose a threat to the respective operator. This system results in a low availability of the press, which unnecessarily limits the operating times of the press.

SUMMARY OF THE INVENTION

It is the object of the invention to create a system that assures reliable monitoring of a detection region of a working element without unnecessarily limiting its availability.

In accordance with the invention, for monitoring a detection region of a working element, at least one camera continuously monitors the detection region.

The image information generated in the camera during the monitoring is read into an evaluation unit.

This image information is used in a comparison to reference images that are stored in the evaluation unit, and/or in a color-feature analysis, to detect endangered objects within at least one protection zone in the detection region.

If at least one endangered object is detected within the protection zone, the evaluation unit disables the working element, whereas the evaluation unit enables the working element if there is no endangered object in the protection zone.

A significant advantage of the protective device of the invention is that a three-dimensional detection region of the working element can be monitored. One camera can perform multiple monitoring functions. Notably, a suitable selection of the monitoring region of the a camera assures both access prevention and the securing of the region of the working element.

A further advantage is that endangered objects located within the detection region detected by a camera, such as a person's hands or fingers, can be distinguished from non-endangered objects. The color-feature analysis of the invention may be used for this distinction. Also, the reference images can be selected such that they detect the non-endangered objects located in a protection zone. Then a comparison of the current image information to the reference images can be used to separate and detect the endangered objects.

In principle, the image information can be compared to the reference images, or evaluated in a color-feature analysis, for assessing whether an endangered object is located in the protection zone.

The two methods are advantageously evaluated in combination. This can significantly increase the verification reliability of the apparatus according to the invention.

For example, the working element can only be enabled if the two methods do not indicate the presence of an endangered object in the protection zone. Therefore, the danger of non-detection of an endangered object can be greatly reduced.

The protective device according to the invention only disables the working element if an endangered object enters a protection zone inside the detection region.

In the simplest case, the protection zone extends over the entire detection region detected by the camera. The protection zone is advantageously dimensioned as a defined partial section of the detection region through the input of parameters into the evaluation unit, or through a learning process. The protection zone can thus be precisely tailored to the danger points to be detected. This avoids monitoring of areas that are not of concern in terms of safety, which considerably increases the availability of the protective device of the invention without reducing the level of safety in the monitoring.

In an advantageous embodiment of the invention, the protection zone can be allocated at least one warning zone, which preferably adjoins the protection zone directly. If an endangered object enters the warning zone, a warning signal is emitted, which provides an early warning for the operator or other person of the impending entry of an endangered object into the protection zone. The operator can therefore undertake appropriate measures to prevent the endangered object from entering the protection zone, thereby avoiding the disabling of the working element. This prevents unnecessary downtime of the working element.

In an advantageous modification of the invention, numerous protection zones and warning zones can be provided within a detection region, corresponding to the requirements of the respective application, in which instance the working element is only disabled if an endangered object is detected in at least one protection zone. Accordingly, a warning signal is emitted if an endangered object is detected in at least one warning zone.

BRIEF DESCRIPTION OF THE DRAWINGS

The invention is described below in conjunction with the following drawings.

DETAILED DESCRIPTION OF THE INVENTION

Figure 1:
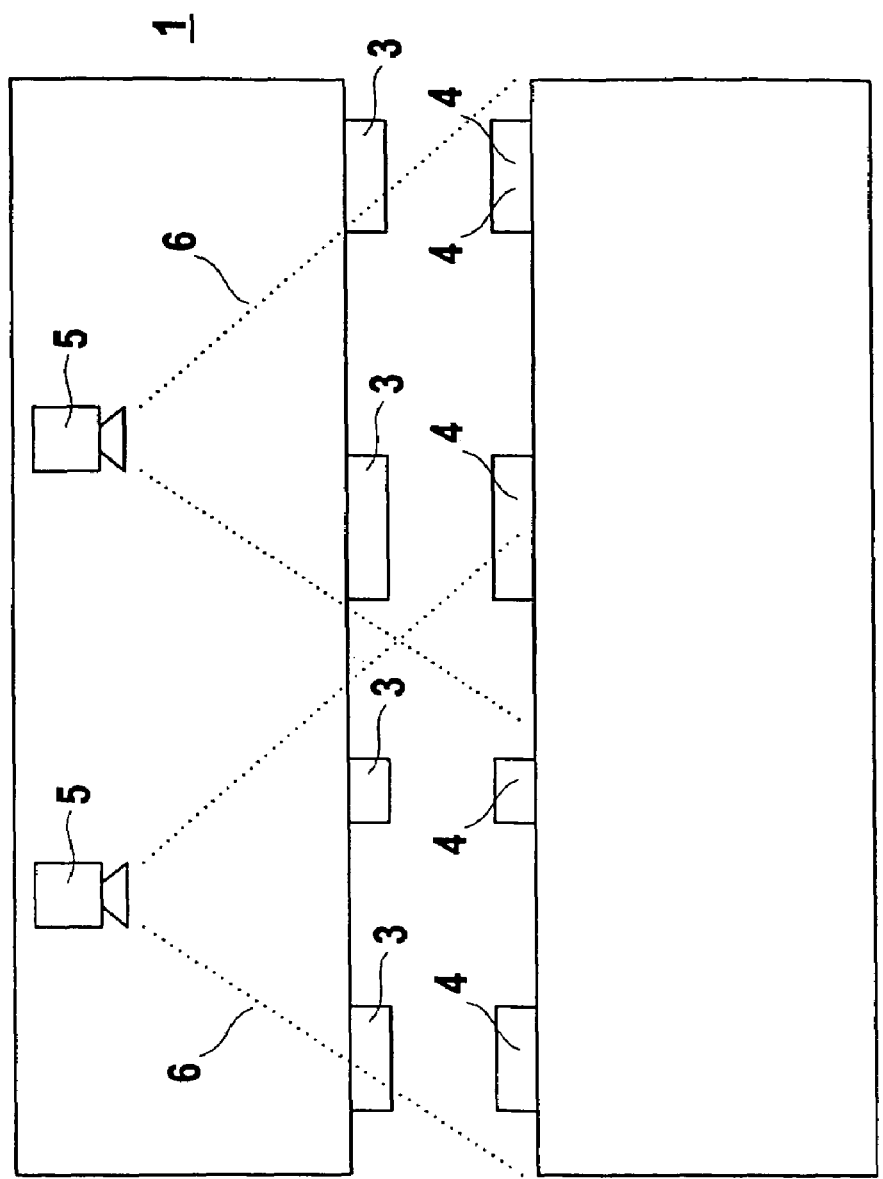
FIG. 1: a front view of a working element formed by a folding press, with two cameras being disposed in front of the element for monitoring detection regions.
Figure 2:
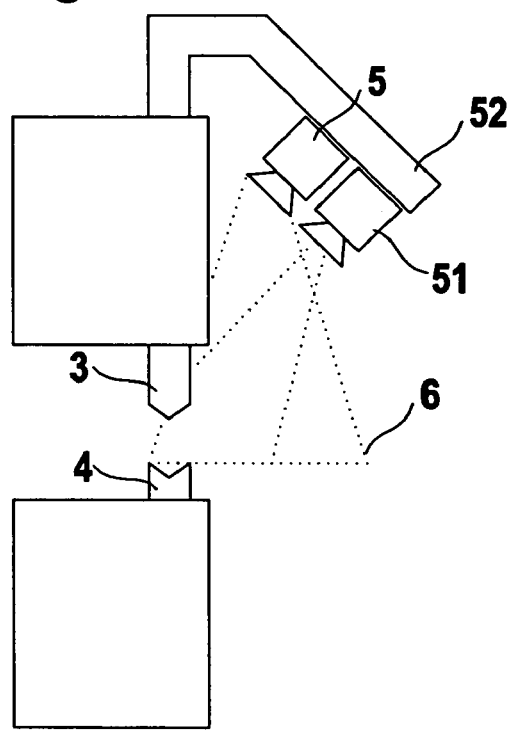
FIG. 2: a side view of the arrangement according to FIG. 1.
Figure 3:
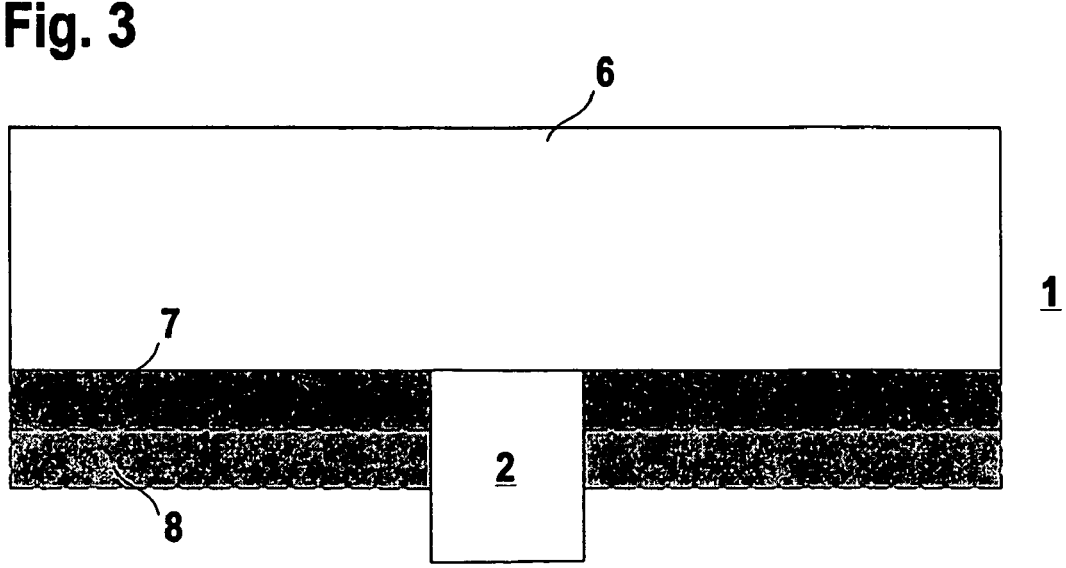
FIG. 3: a cross-section through a section of the arrangement according to FIG. 1, with a protection zone and a warning zone being disposed inside a detection region.
Figure 2A:
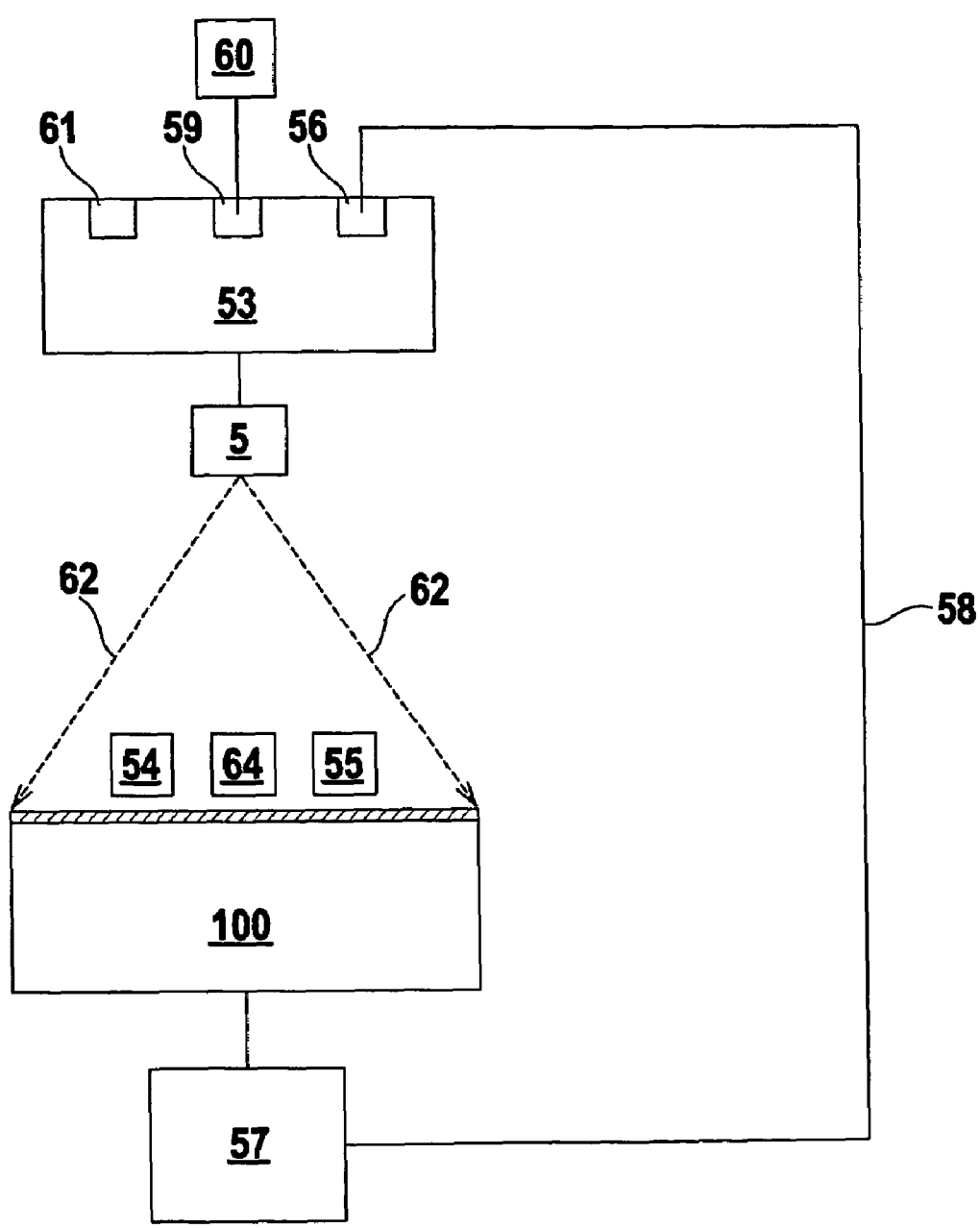
FIG. 2a: a block diagram of the arrangement according to FIGS. 1, 2.

FIGS. 1 through 3 illustrate an exemplary embodiment of a working element 100 configured as a folding press 1, which is monitored with the apparatus of the invention for the purpose of avoiding putting an operator at risk.

The folding press 1 serves to bend and shape workpieces 2, particularly pieces of sheet metal. An upper tool 3 and a lower tool 4, which cooperates with the upper tool, shape a workpiece 2. During a pressing movement, the upper tool 3 and lower tool 4 are guided toward one another, so a workpiece 2 located between them is beveled or bent along a fold line.

In the present embodiment, the folding press 1 has four adjacent pairs of upper tools 3 and lower tools 4. For machining the workpieces, an operator usually brings the workpieces 2 into predetermined positions between the upper tool 3 and the lower tool 4. In the process, the operator is particularly at risk of serious injury when he puts his hands or fingers into the region between the upper tool 3 and the lower tool 4. The movement of the workpiece 2 during the pressing process also poses a tremendous risk of injury for the operator.

The apparatus according to the invention, which constitutes a contactless protective device, is provided for protecting the operator.

The apparatus includes at least one camera 5, preferably a video camera. This camera 5 detects a detection region 6 of the working element 100, corresponding to the aperture angle of the optics, not shown, of the camera 5. In the present embodiment, two cameras 5 are provided in front of the folding press 1. Each camera 5 detects a detection region 6, in which two pairs of upper tools 3 and lower tools 4 are located.

As can be seen from FIGS. 1 through 3, the detection region 6 monitored by a camera 5 forms a three-dimensional spatial area whose base outline has a rectangular cross section. The long side of the detection region 6 extends along the fold lines of the upper tools 3 and lower tools 4 located in the detection region 6. The cross-sectional surface of the detection region 6 tapers upward toward the camera 5, corresponding to the aperture angle of the optics of the camera 5.

The camera 5 is integrated into a housing that is seated in a form-fit on a mechanical holding device 51, such that the holding device is disposed at an incline above the upper tools 3 and lower tools 4. The mechanical holding device 51 can be adjusted in all three spatial directions for orienting the camera 5 relative to the upper tools 3 and lower tools 4. The adjustment is performed independently of the camera 5, so the adjustment of the holding device is even maintained when the camera 5 is replaced.

A separate illumination system 52 can be associated with each camera 5 for achieving uniform illumination of the respective detection region 6.

An evaluation unit 53, is provided in the housing of the camera 5 for evaluating the image information obtained by the camera 5. The evaluation unit 53 is formed by a microprocessor or the like.

In the evaluation unit 53, the image information is assessed so as to permit the detection of endangered objects. In particular, endangered objects 54 and non-endangered objects 55 are distinguished. Endangered objects include the operator, more precisely his hands or fingers. Non-endangered objects include, for example, the front walls of the folding press 1 or other static objects in the surrounding area of the folding press 1, especially the workpieces 2 to be machined.

In accordance with the invention, in the evaluation unit 53, an assessment is performed to determine whether an endangered object 54 is located in a protection zone 7 inside the detection region 6. If this is the case, the evaluation unit disables the working 100 element to protect the operator. If, in contrast, there is no endangered 54 object in the protection zone 7, the evaluation unit 53 enables the operation of the working element 100.

To this end, a binary switching signal is transmitted to the control 57 of the working element 100 via a switching output 56 connected to the evaluation unit 53.

In the evaluation unit 53, the evaluation is performed as follows: Depending on whether an endangered object 54 is present in the protection zone 7, the binary switching signal has a specific switching state. The respective switching state is transmitted to the control 57 of the working element 100, whereupon the working element is enabled or disabled. The switching output 56 is advantageously connected to the control 57 of the working element 100 via a bus system.

To assure the necessary safety level in the respective monitoring process, the evaluation unit 53 with the associated hardware has, in part, a redundant design. The software for the evaluation unit also has a safety standard that corresponds to the safety level. Finally, the bus system is also advantageously embodied as a safety bus system 58.

In the simplest case, the protection zone 7 can be congruent with the monitoring region detected by the camera 5.

The protection zone 7 is advantageously limited to the regions inside the detection region 6, in which the operator is at risk. In the scenario illustrated in FIG. 3, the protection zone 7 represents a three-dimensional partial region of the detection region 6, with the long-side border extending parallel to the fold lines of the upper tools 3 and the lower tools 4 in the detection region 6, the tools being located within the protection zone 7. Thus, the dangerous region at the upper tools 3 and lower tools 4 is detected directly with the protection zone 7.

The embodiment illustrated in FIG. 3 has a warning zone 8 in addition to the protection zone 7. The warning zone 8 is disposed in front of the upper tools 3 and lower tools 4, and directly adjoins the protection zone 7. The protection zone 7 and the warning zone 8 have approximately the same dimensions, notably about the same cross-sectional surfaces.

A warning output 59, which controls a warning indicator 60 is associated with the warning zone 8 via the evaluation unit 53. In the evaluation unit 53, it is determined whether an endangered object 54 is located in the warning zone 8. Depending on the outcome, a binary signal is generated, with the respective switching state of the signal being transmitted via the warning output 59. If an endangered object 54 is registered in the warning zone 8, the warning indicator 60 is activated by the generated switching state, so the warning indicator emits an acoustical and/or optical warning signal.

This signals to the operator that an endangered object 54 is located in the warning zone 8, and thus in the immediate vicinity of the protection zone 7. In particular, the operator is informed that his fingers or hands are in the vicinity of the protection zone 7, so the operator can eliminate the threat of injury by removing his hands from the warning zone 8 without entering the protection zone 7, which would lead to an undesired disabling of the folding press 1.

In an advantageous modification of the invention, the direction of movement of an endangered object within the warning zone 8 is detected. In this case, the warning indicator 60 is only activated if an endangered object 54 inside the warning zone 8 is approaching the protection zone 7.

In principle, a detection region 6 detected by a camera 5 can be divided into a plurality of protection zones 7 and warning zones 8. Here, a separate switching output 56 is associated with a protection zone 7, and a separate warning output 59 is associated with each warning zone 8.

The evaluation unit 53 disables the working element 100 if at least one endangered object 54 is registered in at least one protection zone 7.

Depending on the application, a separate warning indicator 60 can be provided for each warning zone 8. As an alternative, a plurality of warning outputs 59 can be associated with one warning indicator 60.

The states of the switching outputs 56 and the warning outputs 59 can be visually indicated in a suitable way, which requires appropriate display elements 61.

In the embodiment according to FIG. 3, the visual display can be effected, for example, in the manner of a traffic light. If such a light displays a red light, this means that an endangered object 54 is located in the protection zone 7. A yellow signal corresponds to the presence of an endangered object in the warning zone 8, with an empty protection zone 7. A green signal indicates that there is no endangered object 54 in either the protection zone 7 or the warning zone 8.

The protection zone 7 and/or the warning zone 8 can be dimensioned, for example, through the input of parameters into the evaluation unit 53.

The evaluation unit 53 can, for example, be connected to a computer, such as a PC, for starting up and configuring the protective device. The mouse of the PC can be used to graphically input the parameters for the protection zone 7 and/or warning zones 8.

As an alternative, the protection zones 7 and/or warning zones 8 can be dimensioned through a learning process prior to the startup of the protective device.

Furthermore, regions inside the detection region 6 that are alternately activated and deactivated during the monitoring process can also be defined in the described configuration options. These regions can overlap the protection zones 7. In the operating phase of the protective device, these regions are preferably activated at preset times. During these times, if an endangered object enters such a region, the working element 100 is not disabled or a warning signal is not emitted.

The definition of these regions is especially practical if, for example, dangerous tools of a working element 100 are disabled at preset intervals, so the operator is not at risk in these regions during these time intervals.

The definition of the protection zones 7 and the warning zones 8 during the configuration is application-specific, and is adapted to the respective shape of the workpieces 2 to be machined with the working element 100.

In the embodiment according to FIGS. 1 through 3, pieces of sheet metal are bent. Their geometries can be read as CAD data files into the evaluation unit 53, so suitable protection zones 7 and/or warning zones 8 can be defined accordingly.

The regions in which the operator is allowed to hold the bending part for machining are advantageously also read with the CAD data files. The protection zones 7 and warning zones 8 can have a correspondingly-adapted embodiment.

In a particularly advantageous embodiment, visible optical light beams 62 indicate the borders of the respective protection zones 7 to the operator. For the beams, the apparatus of the invention includes a transmitter, which is actuated by the evaluation unit 53 and emits light beams in the visible range. The optical light beams provide a visual indication of straight-line borders of the protection zones 7.

Finally, in the configuration of the protection device of the invention, the device can learn about endangered objects and/or non-endangered objects during a learning process.

In the apparatus of the invention, a camera 5 continuously monitors a detection region 6, with the image information that has been generated in the camera 5 being read into the evaluation unit 53.

According to a first variation of the method of the invention, a color-feature analysis serves in the evaluation of the image information.

The image information of the camera 5 is then read, as color values, into the evaluation unit. The color-feature analysis aids in the distinction between endangered objects and non-endangered objects 53.

Each image of the camera 5 is formed by a pixel matrix, with specific color values of the base colors of red, green and blue being associated with each pixel.

A threshold-value unit, which is a component of a neural network, assesses these images. In principle, the color values of the different base colors can be assessed with separate threshold values that are generated in the threshold-value unit.

In the present embodiment, in the evaluation unit 53, a linear combination of the individual color values of the base colors is formed for each pixel of an image. The individual color values are weighted with weighting factors that are stored in the evaluation unit 53 or can be predetermined by the unit. This linear combination is assessed with a threshold value that has been generated in the threshold-value unit. In this way, a binary image is created from the color image generated in the camera 5. The threshold value and the weighting factors are adapted such that the endangered objects are, for example, bright regions of foreground pixels that stand out against a dark background of background pixels.

The threshold values and the weighting factors are advantageously determined during the learning process. At this time, the colors of the endangered objects are learned. The endangered objects are preferably the hands and/or fingers of the individual operating the working element 100.

In principle, the hands and/or fingers of numerous persons can also be learned.

As an alternative for the case of endangered objects comprising body parts, it is required that the persons wear a protective covering of a predetermined color. In this way, the parameters for the image evaluations are adapted to the color of the protective covering.

In the binary images generated by the threshold-value unit, the endangered objects form connected regions of foreground pixels that stand out against the background pixels. Non-endangered objects such as the workpieces 2 and the working element 100 form the background pixels.

At isolated points, the binary image can be noisy due to pixel errors, so individual foreground pixels appear in the background region. These pixel errors can be eliminated through the application of morphological operators. In the process, isolated regions of foreground pixels whose surface areas are smaller than a predetermined minimum surface area are eliminated. These minimum surface areas are selected to be significantly smaller than the surface area of the smallest endangered object to be detected.

In accordance with a second variation of the method of the invention, the images that have been generated by the camera 5 and read into the evaluation unit 53 are compared to reference images stored in the evaluation unit 53 for recognizing endangered objects within the protection zones 7 and/or the warning zones 8.

In an advantageous embodiment of the invention, the images and reference images are converted into binary edge images prior to the comparison. For this purpose, the amounts of the gradients of the brightness distributions of an image or reference image are evaluated, preferably with a suitable threshold value. The binary edge images formed in this manner contain structures of lines on a homogeneous background, with the lines corresponding to the edges of the objects located in the detection region 6.

This evaluation renders the detection of objects extensively independent of the respective illumination conditions, so fluctuations in brightness, such as changing sunlight, do not result in erroneous detections.

To further increase the verification reliability, the protection zone 7 is advantageously bordered at least partly by a reference object having a defined contrast pattern. The reference object can be formed by, for example, a disk that has a characteristic surface pattern, and is mounted to the folding press 1 beneath a lower tool 4 such that it is positioned in the viewing field of the camera 5. The surface pattern of the disk can be embodied, for example, as a colored striped pattern, so it is clearly distinguished from the color patterns of the endangered objects.

The comparison of the current images to the reference image containing the reference object allows the endangered objects in the protection zone 7 to be detected with a high reliability.

This method should not include a feature analysis of the objects entering the protection zone 7, so every such object is regarded as an endangered object 54.

In the machining of workpieces 2 by the working element 100, the workpieces 2 can enter the protection zone 7 at predetermined times during which the disabling of the working element 100 is undesirable.

For example, the operator must be able to insert and process a workpiece 2 embodied as a bending part between the upper tool 3 and lower tool 4 of a folding press 1 without the folding press 1 being unnecessarily shut down by the protective device.

In an advantageous embodiment of the invention, therefore, in a learning process prior to the startup of the folding press 1, the camera 5 records the individual steps for machining a workpiece 2, thereby recording and storing reference images for individual machining phases. The reference images specifically depict the workpiece 2 in different machining positions.

In the operating phase of the working element 100 that follows the learning phase, the camera 5 again records the same machining steps. A comparison of the recorded images to the respective reference images can reveal the intrusion of endangered objects, such as a person's hands or fingers. The respective protection zones 7 and/or warning zones 8 can be selected to change over time for the individual machining steps.

A particular advantage of this is that the comparison to the respective reference images permits the distinction of endangered objects from the workpiece 2, which represents a non-endangered object 55. Consequently, the workpiece 2 located inside the protection zone 7 does not cause the protective device to unnecessarily disable the folding press 1. A suitable, time-dependent dimensioning of the protection zones 7 and/or warning zones 8 allows the detection region to be flexibly adapted to the changing marginal conditions.

This method can encompass the following steps, for example:

In the learning phase prior to startup, a machining process is performed in its entirety with a workpiece 2 in the folding press 1.

First, the operator inserts the workpiece 2 into the folding press 1, so it lies inside the press 1. A retaining device may be utilized for this purpose. Because the upper tool 3 and the lower tool 4 are deactivated in this phase, the protection zone 7 is dimensioned such that the operator can reach into the region between the upper tool 3 and the lower tool 4. Particularly in this case, the protection zone 7 can also be bridged and completely deactivated.

Afterward, the operator removes his hands from the workpiece 2 and the fold line between the upper tool 3 and the lower tool 4, so a predetermined safety distance is exceeded. During this machining step, the protection zone 7 is dimensioned in the evaluation unit 53 to encompass the region of the upper tool 3 and the lower tool 4 up to this safety distance.

A foot switch initiates the lowering of the upper tool 3 toward the lower tool 4 until the workpiece 2 is held without play between the upper tool 3 and the lower tool 4. Thus, the operator can no longer insert his hands or fingers between the upper tool 3 and the lower tool 4, so the folding press 1 no longer poses a threat to him.

The operator can therefore safely orient the workpiece 2 manually on the folding press 1. As soon as the workpiece 2 is oriented correctly on the folding press 1, its image is recorded along with the upper tool 3 and the lower tool 4 as a first reference image, and stored in the evaluation unit 53.

The bending process, in which the workpiece 2 is bent upward, is then initiated. The free end of the workpiece 2 is bent upward to an intermediate position. The bending process is only performed until a sufficient spacing is present between the free end of the workpiece 2 and the upper tool 3 to prevent the risk of injury to the operator due to a so-called upper jaw clamp.

In this position, a second reference is recorded and stored; this image depicts the positions of the upper tool 3 and the workpiece 2.

During these processes, the operator is at no risk for injury, so the protection zone 7 can be selected to be correspondingly small.

Finally, the bending process of the workpiece 2 is completed, at which point the operator must remove his hands from the region of the workpiece 2, because the risk of injury is present again. A larger protection zone 7, which is adapted to the safety distance that must be maintained, is advantageously specified in this phase.

After the learning process has ended, the folding press 1 is enabled, with the workpiece 2 being machined in the same machining sequence that was learned in the learning process.

The operator first inserts the workpiece 2 between the upper tool 3 and the lower tool 4, which are deactivated at this time. The protection zone 7 is dimensioned such that this action does not lead to the disabling of the folding press 1.

In the next machining step, the foot switch effects the lowering of the upper tool 3 until the workpiece is held without play between the upper tool 3 and the lower tool 4. In this phase, the protection zone 7 is dimensioned such that an intrusion into the region of the fold line results in the disabling of the folding press 1.

The operator can then safely orient the workpiece 2 located between the upper tool 3 and the lower tool 4; the present embodiment of the protection zone 7 prevents the disabling of the folding press 1 due to the manual access to the workpiece 2.

As soon as the workpiece 2 is oriented, the bending process is initiated. The bending process is only started if the images currently being recorded in the camera 5 match the first reference image showing the oriented workpiece 2.

During the subsequent bending of the workpiece 2 to the intermediate position, the operator can again manually guide the workpiece 2.

The current images of the camera 5 are compared to the second reference image to ascertain whether the intermediate position has been reached.

While the bending process continues from the intermediate position, operator intrusion into the region of the workpiece 2 again leads to the shutdown of the folding press 1.

To check the function of the protective device of the invention, a self-test is performed at predetermined intervals. The self-test is advantageously performed periodically and automatically, that is, without external activation.

In the present embodiment, both a static self-test and a dynamic self-test are performed.

The static self-test essentially checks whether predetermined fixed points are present in the images generated by the camera 5. If the fixed points are absent, or have changed, an error message is generated and the working element 100 is disabled.

This static self-test utilizes the fact that the camera 5 remains oriented precisely in terms of position on the holding device, so certain objects, such as parts of the working element 100 or other equipment, building walls or the like, remain unchanged in the detection region 6 detected by the camera 5. During a learning process prior to the startup of the protective device, such objects are learned as fixed points and stored in the evaluation unit 53.

This static self-test is particularly used to check the functioning capability of the optical components of a camera 5.

In the dynamic self-test, a defined, preferably endangered, test object 64 is brought into the region of a protection zone 7 at predetermined times. If this test object is not recognized at the predetermined times, the working element 100 is not enabled, or if it is operating, it is disabled.

This dynamic self-test is advantageously performed before the protective device is started up. In principle, the dynamic self-test can also be performed during the operation of the protective device. In this case, however, it must be ensured that the location of entry of the test object 64, or its embodiment, distinguishes it from the endangered objects to be detected during the operation of the protective device. Afterward, the test object 64 is verified independently of the detection of endangered objects, and therefore does not impair the verification reliability of the protective device.

Figure 4:
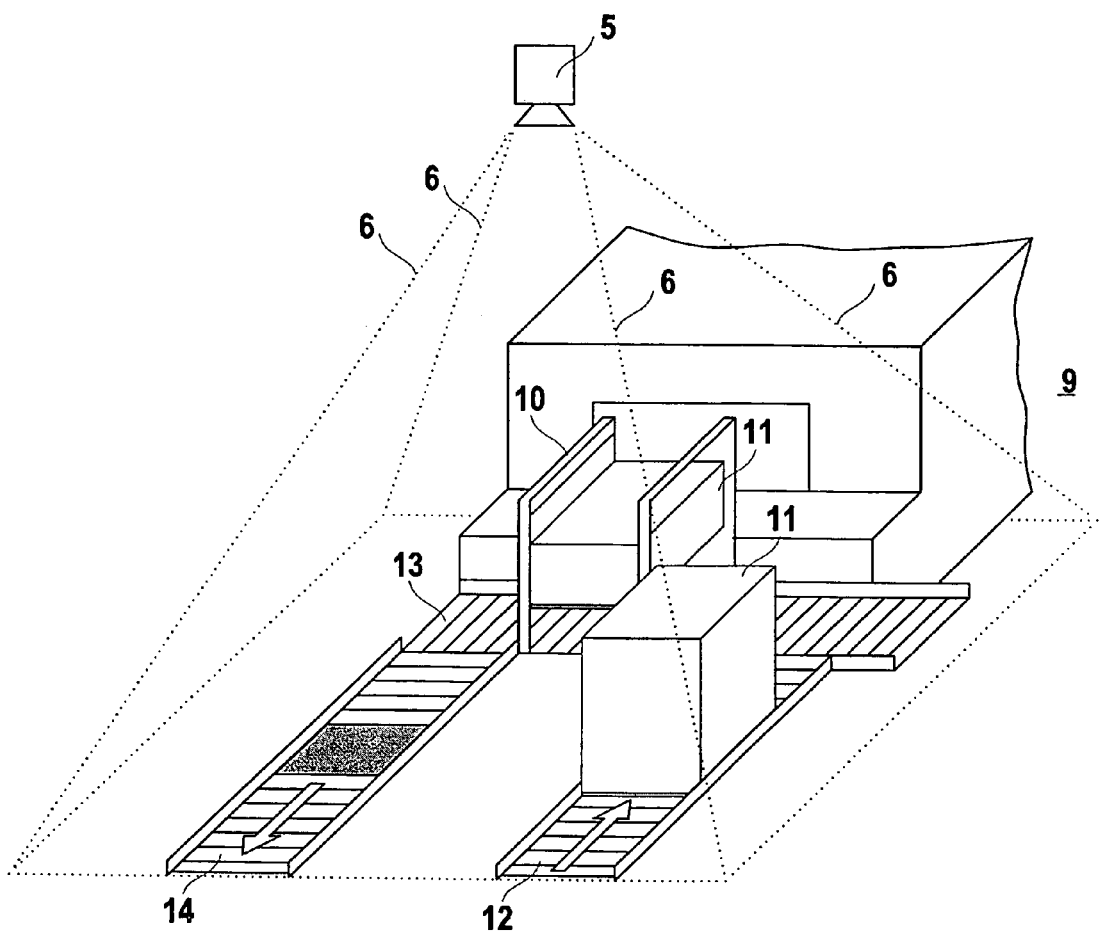
FIG. 4: a working element embodied as a printing press, having a camera for monitoring a monitoring region that extends over the region of the feed and output mechanisms of the press.
Figure 5:
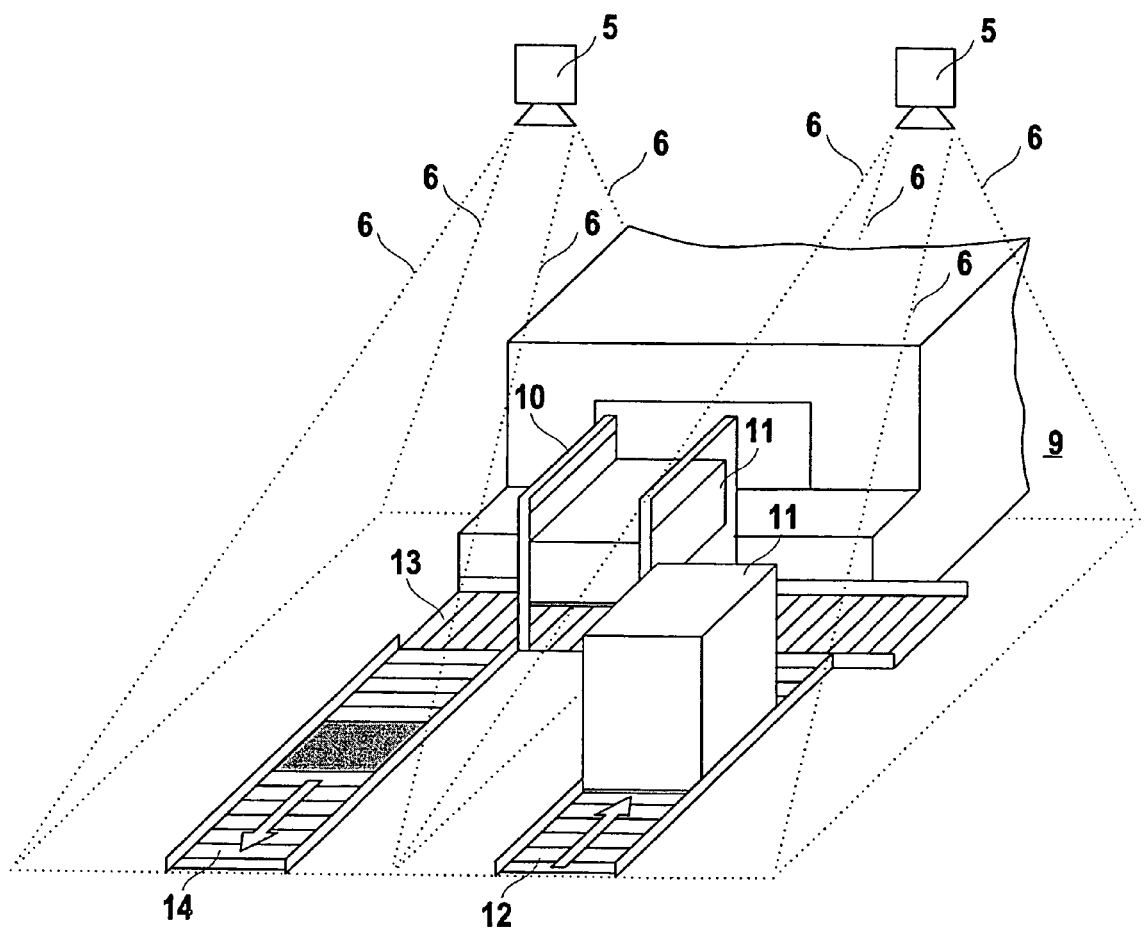
FIG. 5: the printing press according to FIG. 4, having two cameras for monitoring the region of the output mechanism and the feed mechanism.

FIGS. 4 and 5 illustrate embodiments in which a printing press 9 constitutes the working element 100 monitored by the protective device of the invention.

FIG. 4 shows a printing press 9 having a feeder 10 and an output. The feeder 10 forms the insertion region, in which paper sheets are drawn from paper stacks 11 and a fed into the printing apparatus of the printing press 9. A chain conveyor 12 supplies the individual paper stacks 11, on pallets, to the feeder 10. In the region of the feeder 10, the paper stacks 11 are transported on a roller conveyor 13. After the paper sheets have been printed, a second chain conveyor 14 in the output region transports them away from the printing press 9 in paper stacks 11 stacked on pallets. In the regions of the chain conveyors 12, 14 and the feeder 10, the traveling movements of the pallets with the paper stacks 11 represent a risk of injury for the operator.

In known printing presses 9, these detection regions 6 are secured by an enclosure that completely prevents operator access. However, this severely and unnecessarily limits the visibility and accessibility of the printing press 9. In particular, it is impossible or very difficult to position non-endangered objects in the detection region 6.

In the embodiment illustrated in FIG. 4, a camera 5 is mounted above the printing press 9 such that the detection region 6 detected by the camera encompasses the regions of the feeder 10 and the chain conveyors 12, 14.

Monitoring with the camera 5 is performed analogously to the embodiments of FIGS. 1 through 3. In particular, the detection region 6 is again divided appropriately into protection zones 7 and possibly warning zones 8, inside which endangered objects can be detected.

FIG. 5 shows a second embodiment of a protective device in a printing press 9. The printing press 9 corresponds to the printing press 9 according to FIG. 4. In contrast to the protective device according to FIG. 4, however, the protective device according to FIG. 5 has two cameras 5. The detection region 6 detected by the first camera 5 encompasses the first chain conveyor 12 for supplying paper stacks 11 to the printing press 9.

The detection region 6 detected by the second camera 5 encompasses the second chain conveyor 14 for transporting paper stacks 11 away from the printing press 9.

The detection regions 6 recorded by the cameras 5 are dimensioned such that their widths are larger than the widths of the chain conveyors 12, 14. In this way, endangered objects can be detected before they have entered the region of the chain conveyors 12, 14. For orienting the operator, the borders of the protection zones 7 inside the detection regions 6 can be marked with lines on the floor of the room housing the printing press 9.

In the embodiments according to FIGS. 4 and 5, the paper stacks 11 transported on pallets are learned as non-endangered objects and stored in the evaluation unit 53 before the protective device is started up.

Figure 6:
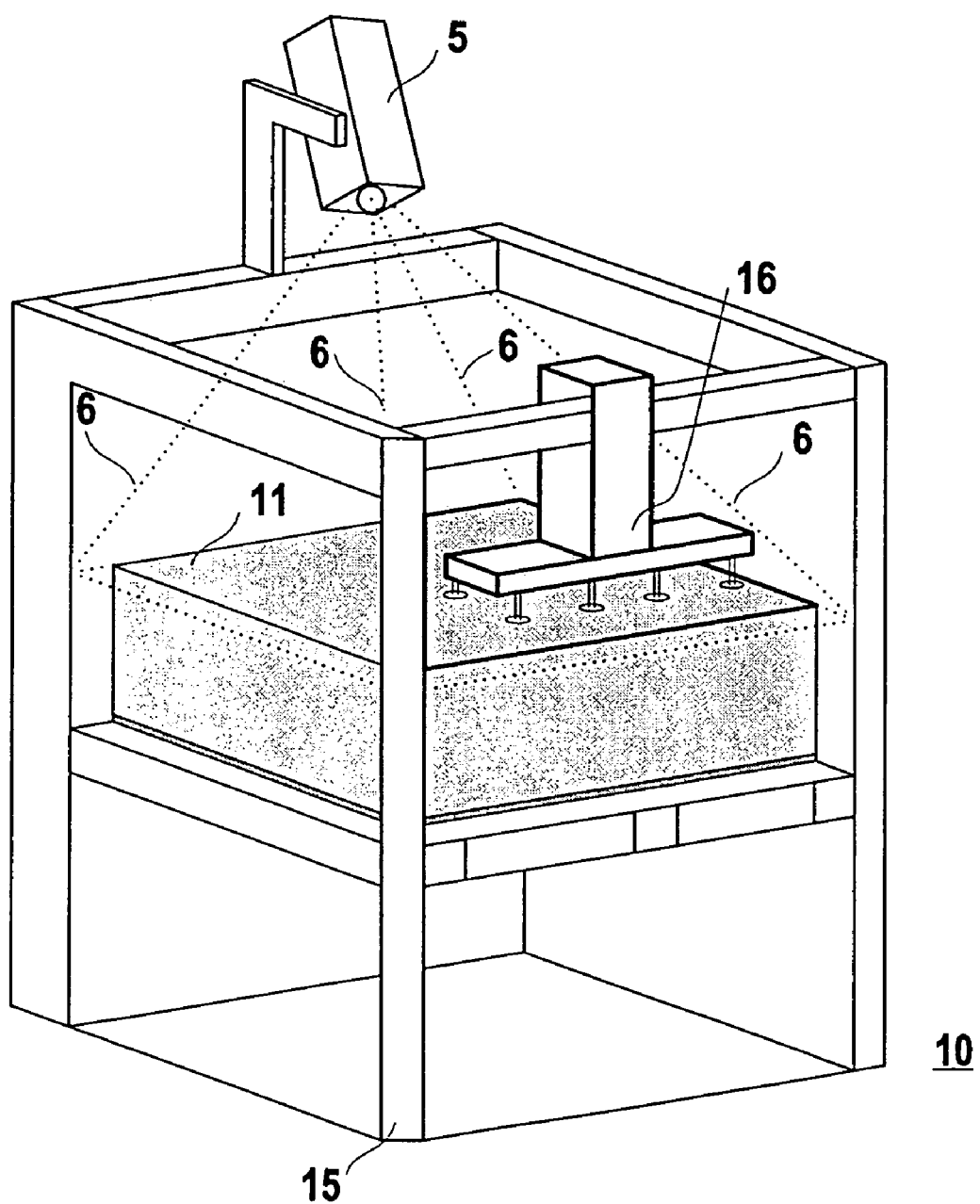
FIG. 6: a region monitored by a camera, namely the paper feed at the feed mechanism of the printing press according to FIG. 4 or 5.

FIG. 6 illustrates a feeder 10 of a printing press 9 that is monitored by a protective device having a camera 5. The embodiment of the printing press 9 corresponds to that of the printing press 9 according to FIGS. 4 and 5.

The feeder 10 essentially comprises a frame 15, inside which a paper stack 11 is disposed. A gripping element 16 draws paper sheets from the top of the paper stack 11 into the printing apparatus, not shown, of the printing press 9.

The camera 5 is mounted above the feeder 10 such that the detection region 6 detected by the camera 5 encompasses the top of the paper stack 11 and the gripping element 16. The protection zone 7 inside the detection region 6 is dimensioned to completely encompass the working region of the gripping element 16, which executes movements that could injure the operator.

Figure 7:
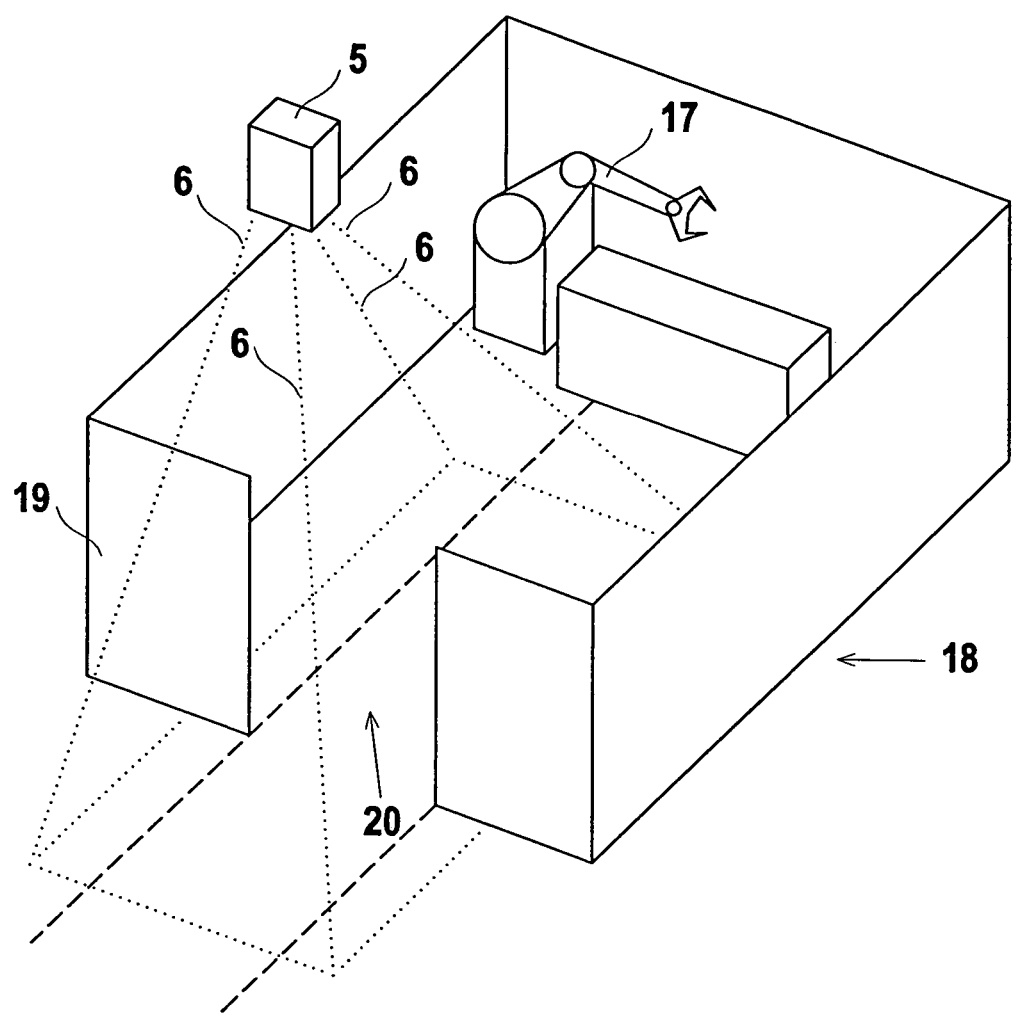
FIG. 7: a working element embodied as a welding robot, having a camera for monitoring a detection region in the region of access to the welding robot.

FIG. 7 shows an embodiment of a protective device that serves to monitor the region in front of a working element 100 embodied as a working robot. In the present embodiment, a welding robot 17 constitutes the working robot.

The welding robot 17 is located in an enclosed production cell 18 having an enclosure 19, which is provided with an access opening 20. Objects are introduced into and transported out of the production cell 18 via the access opening 20. In addition, the operator has access to the production cell 18 via the access opening 20. The region of the access opening 20 constitutes the detection region 6 monitored by the camera 5 of the protective device.

The detection region 6, which is again divided into one or more protection zones 7 and possibly warning zones 8, is located at a distance from the working region of the welding robot 17. Consequently, if an endangered object enters a protection zone 7, the welding robot 17 is promptly disabled before the endangered object can pass through the protection zone 7 to the welding robot 17. In this case, persons constitute the endangered objects. Non-endangered objects, such as the workpieces 2, that can enter a protection zone 7 are preferably learned and stored in the evaluation unit 53 prior to the startup of the protective device.

The invention has been described in detail with respect to preferred embodiments, and it will now be apparent from the foregoing to those skilled in the art, that changes and modifications may be made without departing from the invention in its broader aspects, and the invention, therefore, as defined in the appended claims, is intended to cover all such changes and modifications that fall within the true spirit of the invention.

The invention claimed is:

1. A method for monitoring a detection region of a working element, the method comprising the following steps:

monitoring continuously a detection region with at least one camera;

reading image information, in the form of color values, generated in the camera during the monitoring into an evaluation unit wherein the image generated by the camera is read into the evaluation unit in the form of a pixel matrix with different color values;

distinguishing endangered objects from non-endangered objects with the evaluation unit based on the color values;

disabling the working element with the evaluation unit, if at least one endangered object is detected within at least one protection zone in the detection region; and enabling the working element with the evaluation unit if no endangered object is located in the protection zone, wherein the distinguishing step includes assessing the color values with a threshold-value unit; and creating binary images based on the assessment with the threshold-value unit and wherein the assessing step comprises:

associating three color values of the base colors of red, green and blue with each pixel of the image read into the evaluation unit;

assigning the color values predetermined weight factors;

creating a linear combination from the color values using the weight factors; and assessing the linear combination of color values with the threshold-value unit using a threshold value.

2. The method according to claim 1, wherein the threshold-value unit is a component of a neural network.

3. The method according to claim 1, further comprising, determining at least one of the threshold value and the weight factors through a learning process, in which colors of the endangered objects are established.

4. The method according to claim 1, wherein the endangered object are of a predetermined color, with the threshold value being adapted to the predetermined color.

5. A method for monitoring a detection region of a working element, the method comprising the following steps:

monitoring continuously a detection region with at least one camera;

reading image information, in the form of color values, generated in the camera during the monitoring into an evaluation unit wherein the image generated by the camera is read into the evaluation unit in the form of a pixel matrix with different color values;

distinguishing endangered objects from non-endangered objects with the evaluation unit based on the color values;

disabling the working element with the evaluation unit, if at least one endangered object is detected within at least one protection zone in the detection region;
enabling the working element with the evaluation unit if no endangered object is located in the protection zone;
   forming a connected region of foreground pixels in the binary images generated by the threshold-value unit to represent the endangered objects; and eliminating individual foreground pixels in a background around the connected region using morphological operators, wherein the distinguishing step includes assessing the color values with a threshold-value unit; and creating binary images based on the assessment with the threshold-value unit.

* * * * *